Figure 1:
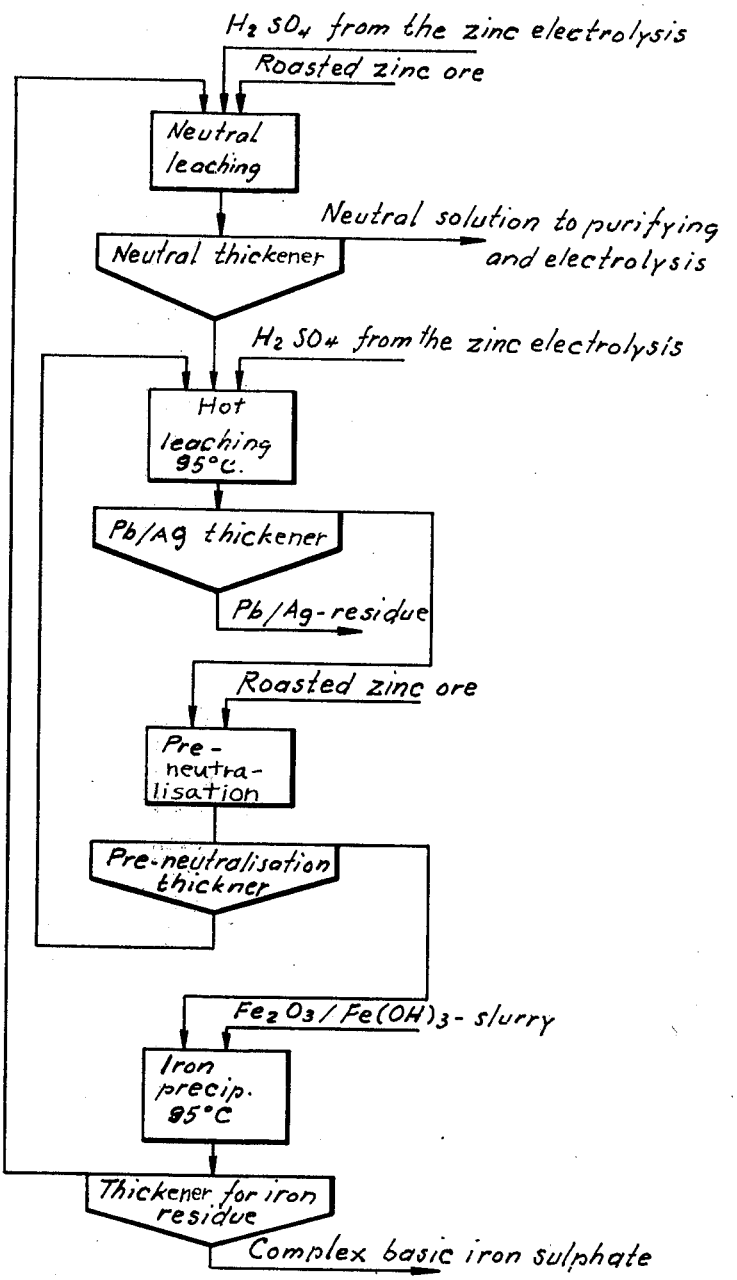

United States Patent
Steintveit

[11] 3,983,210
[45] Sept. 28, 1976

[54] PROCESS FOR SEPARATION OF IRON FROM METAL SULPHATE SOLUTIONS IN HYDROMETALLURGIC PROCESSES

[75] Inventor: Georg Steintveit, Odda, Norway

[73] Assignee: Det Norske Zinkkompani A/S, Odda, Norway

[22] Filed: Apr. 23, 1974

[21] Appl. No.: 463,265

Related U.S. Application Data

[63] Continuation-in-part of Ser. No. 181,821, Sept. 20, 1971, abandoned.

[30] Foreign Application Priority Data

| Sept. 30, 1970 | Norway | 3703/70 |
| Apr. 10, 1971 | Germany | 2117584 |
| Apr. 16, 1971 | Netherlands | 7105172 |

[52] U.S. Cl. .......................... 423/106; 423/146; 75/108; 75/120; 75/121
[51] Int. Cl.² .................................. C01G 9/06
[58] Field of Search ............... 75/101 R, 109, 108, 75/117, 121, 118, 120, 115; 423/146, 102, 140, 144, 150, 138, 109; 204/119

[56] References Cited
UNITED STATES PATENTS

| 1,834,960 | 12/1931 | Mitchell | 204/119 |
| 2,871,116 | 1/1959 | Clark | 75/108 |
| 3,295,961 | 1/1967 | Colombo et al. | 75/101 R |
| 3,434,947 | 3/1969 | Steintveit | 204/119 |
| 3,574,537 | 4/1971 | Tsai | 423/146 X |
| 3,652,264 | 3/1972 | Bodson | 75/115 X |

Primary Examiner—G. Ozaki
Attorney, Agent, or Firm—Pennie & Edmonds

[57] ABSTRACT

The process disclosed is for separation of iron from sulphuric acid acidified sulphate solutions containing zinc to be recovered and iron, the process comprising reacting such a solution at atmospheric pressure and at temperatures of 60 to 100°C., preferably 85°–95°C., with a precipitating agent, in the form of a slurry or solid material containing $Fe_2O_3$ or $Fe(OH)_3$ as an essential component. The precipitating agent optionally may be "red mud," a byproduct from the decomposition of bauxite. The precipitating agent may contain or have added thereto $Al_2O_3$ and $TiO_2$ which also contribute to the hydrolysis of the solution. The acid strength of the solution is adjusted to a pH of 1.0 – 2.5, preferably 1.4 – 1.7 by controlling additions of the said precipitating agent to the sulphate solution.

6 Claims, 2 Drawing Figures

PROCESS FOR SEPARATION OF IRON FROM METAL SULPHATE SOLUTIONS IN HYDROMETALLURGIC PROCESSES

RELATED CASE

This application is a continuation-in-part of my copending U.S. application Ser. No. 181,821 filed Sept. 20, 1971 now abandoned.

PRIOR ART PROCESS

In conventional practice of acid leaching for zinc from iron-containing zinc ores, the acid strength must be limited in order to avoid dissolving substantial amounts of iron; the amount of zinc bonded by the zinc ferrites is thus lost, since the iron precipitation from the resulting zinc sulphate solution is extremely difficult. The final residue contains 18 – 22% zinc weight therefore. The primary object of the invention is to provide an improved process for the recovery of or production of zinc from its ores or from residues or acid solutions containing zinc.

SUMMARY OF THE INVENTION

In accordance with the invention, the zinc-containing iron ore or the zinc-iron-containing residue may be dissolved in strong acid and at high temperatures without regard to whether the iron is dissolved, since, according to the invention, it is possible to precipitate the dissolved iron after the undissolved lead and silver-containing residue has possibly been separated by the addition of a solid material or slurry which, to a substantial degree, contains iron oxide or iron hydroxide, for example, red mud, a residue from the production of $Al_2O_3$. The red mud residue is a known waste material produced in the Bayer process of decomposition bauxite in an autoclave with a caustic soda leach. The basic effect of this oxide or hydroxide is thereby utilized for precipitation of iron in the form of complex basic iron sulphates under optimal process conditions. In this manner, it has proved possible to precipitate an iron content of from about 35 g/l to 1 g/l, for example 15 g/l to less than 1 g/l. It is thereby possible to produce a Fe-residue which is substantially free from the metal values (Zn, Cu, Cd, Pb, Ag) which are of significance to the economy of the process, and a yield of 99% of all these metals is obtained.

DETAILED DISCLOSURE OF THE INVENTION

The invention thus relates to a process for the separation of iron from sulphuric acid acidified metal sulphate solutions, of the kind referred to above, the process being characterized in that the solution, either continuously or in batches is brought to react, at temperatures of 60° – 100°C, preferably 85° – 95°C, and at atmospheric pressure with a precipitating agent in the form of a slurry or a solid material, containing $Fe_2O_3$ or $Fe(OH)_3$ as an essential component, it being possible also for the precipitating agent to contain or to have added thereto, for example 10 – 20% $Al_2O_3$ and 5 – 10% $TiO_2$ by weight, which then also contribute to the hydrolysis process together with $Fe_2O_3$ or $Fe(OH)_3$ during the formation of complex basic aluminum and titanium sulphates, the acid strength of the solutions being adjusted to pH 1.0 to 2.5, preferably 1.4 – 1.7 by means of controlled additions of the said slurry or solid materials.

In the process according to the invention, $Fe_2O_3$ or $Fe(OH)_3$ slurry or solid material can be red mud, produced as waste residue or byproduct in the decomposition of bauxite. The sulphuric acid acidified metal sulphate solution is a ferrous zinc sulphate solution produced by decomposition of zinc ferrite-containing materials (roast materials, leaching residue etc.) by known processes to increase the leach yield in hydrometallurgic processes for the production of zinc.

By using a precipitating agent which does not contain zinc or other of the metals which are significant to the economy of the zinc process, the precipitated slurry has a very low percentage by weight of these metals, and it is possible to obtain previously unobtainable yields of, for example, Zn, Cu, Cd, Pb and Ag in the leaching process. Apart from iron compounds the described precipitating agent, optionally red mud, also contains $TiO_2$ and $Al_2O_3$, which also contributes to the hydrolytic reaction during the formation of complex basic aluminum and titanium sulphates.

The Fe-containing slurry which is produced in this manner exhibits good flocculating, clearing and filtering properties.

The acid solution from the hot leach step which contains, for example, from 30 – 100 g/l of acid can first be subjected to pre-neutralization, for example, 5 – 20 g/l $H_2SO_4$ by the addition of roasted concentrate or other Zn-containing neutralizing agents, and that the residue from this process step is recycled to the hot leach step. In this manner, not only is an effective leaching of any zinc ferrites present in the residue achieved, but also the recovery of Pb and Ag in this part of the calcine or neutralizing agent and, at the same time, the need for neutralizing agent in the iron precipitation step and thereby also the amount of residue is reduced.

The acid solution from which the iron is to be precipitated may be produced in accordance with the process illustrated in the working diagram on FIG. 1.

A leaching of the roasted zinc ore is first carried out in sulphuric acid from the zinc electrolysis. Roasted zinc ore is added in excess so that the leaching is neutrally terminated. The thickened slurry passes to heat leaching with sulphuric acid at 95°C. The undissolved residue, which then contains the lead and silver values of the ore, is separated by thickening and the acid ferrous solution is pre-neutralized thereafter with roasted znc ore from, for example, 40 – 60% $H_2SO_4$ to about 10% $H_2SO_4$. The thickened residue from this step returns to the hot leach, while the solution is further neutralized to a pH, of 1.0 – 2.5, preferably 1.4 – 1.7, with the addition at atmospheric pressure of $Fe_2O_3$ or $Fe(OH)_3$ or with red mud containing these compounds as main component and also some Ti and Al oxide compounds. Complex basic sulphates with an iron content higher than pure jarosite are thereby precipitated.

Figure 2:
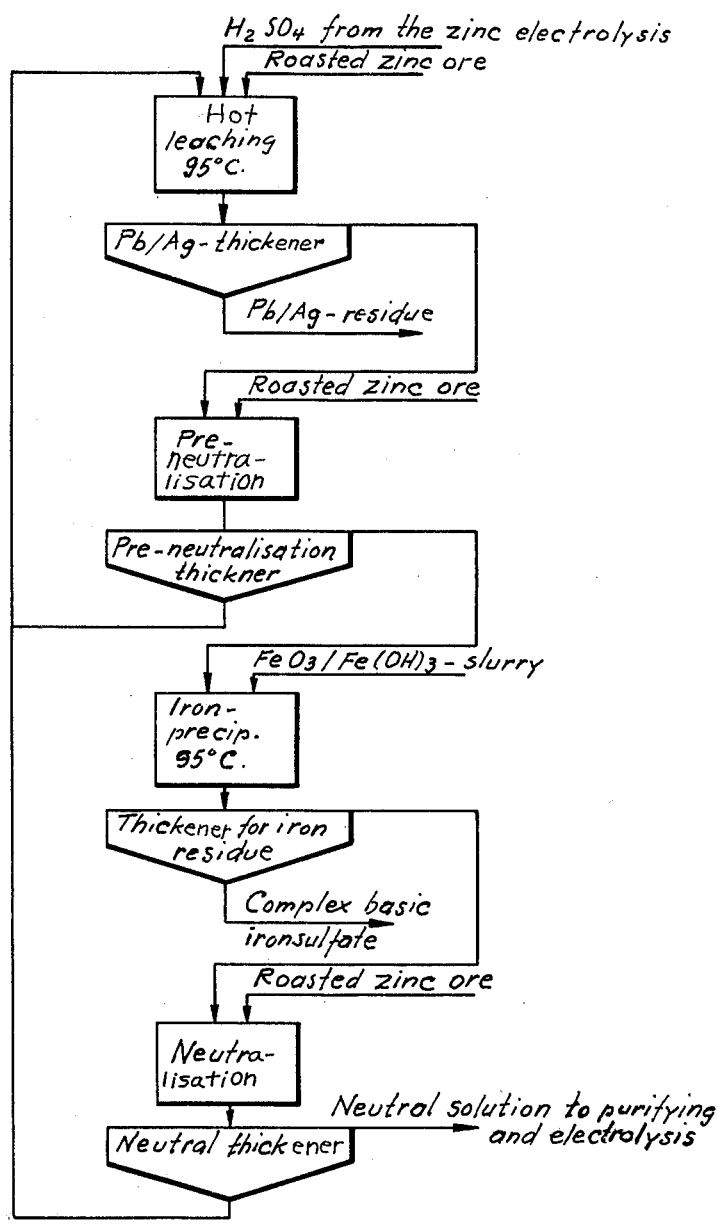

By this process, the working diagram of which is illustrated on FIG. 2 of the drawing, a hot leaching of the roasted zinc ore is carried out as a first step. Thereafter, the undissolved residue is separated and the solution is pre-neutralized with roasted zinc ore. The residue is separated and recycled, the iron being precipitated at a pH of 1.0 – 2.5, preferably 1.4 – 1.7, as a complex basic sulphate and separated by thickening. The solution is completely neutralized with roasted zinc ore. Slurry and solution are separated. The slurry is recycled, the neutral zinc solution being passed further to purifying and zinc electrolysis.

EXAMPLE

A Fe-containing zinc sulphate solution produced by hot acid leaching of a zinc ferrite- containing leaching residue in accordance with the process described, was pre-neutralized with roasted zinc concentrate to an acid strength of 10 g/l $H_2SO_4$. A flocculating agent was added to the suspension in conventional manner and it was decanted from a solution with the following composition.

|  |  |  |  |
|---|---|---|---|
| Zn | = | 150 | g/l |
| Fe | = | 15.2 | g/l |
| $H_2SO_4$ | = | 10 | g/l |
| Cu | = | 0.8 | g/l |
| Cd | = | 0.5 | g/l |

2 liters of this solution were heated at 95°C in a thermostatic controlled container provided with stirring means and open to atmospheric pressure. "Red mud," produced by decomposition of bauxite, in known manner, was added to the solution in portions, to a total of 110 g. During addition of "red mud," the pH rose to about 0.5, where it is stabilized. After 75 minutes reaction time the Fe-content in the solution had decreased to 13.6 g/l, after 105 min. to 6.0 g/l, further, after 135 min. to 3.0 g/l, after 170 min. to 2.0 g/l and after a total of 270 minutes reaction time, the Fe-content had decreased to 1.0 g/l.

25 mg/l flocculating agent ("Superfloc 20") was added to the suspension, which gave very effective flocculation and a rapid settling of the precipitated slurry. After decanting, a slurry was filtered which, after washing, had an analysis as stated hereinbelow: The total amount of filtered dry material was 170 g.

Analysis Table.

| Red mud used as precipitating agent (% by weight) | | | | | |
|---|---|---|---|---|---|
| Fe % | Zn % | Cu % | Cd % | Al % | Ti % |
| 39.2 | 0.14 | .01 | traces | 3.5 | 3.0 |

| Precipitated compound of complex basic sulphate (% by weight) | | | | | | | |
|---|---|---|---|---|---|---|---|
| Fe % | Zn %$^{tot}$ | Cu % | Cd % | Pb % | $SO_4$ % | Al % | Ti % |
| 41.2 | 0.75 | .05 | .002 | .05 | 15.8 | 3.6 | 3.1 |

I claim:
1. A process for the separation of iron from and the recovery of zinc from zinc sulphate solutions acidified with sulphuric acid and in which said solutions have a content of iron comprising the steps of adding a precipitating agent to such a solution and reacting it therewith at atmospheric pressure and at a temperature of from 85° to 95°C. thereby converting the iron content of the solution to a complex basic iron sulphate residue, said precipitating agent containing $Fe_2O_3$, $Fe(OH)_3$, or both, adjusting the acid strength of the solution during the reaction to a pH of from 1.4 to 1.7 by controlling the additions of precipitating agent added to the solution, and separating the resulting iron sulphate residue from the solution containing the zinc.

2. A process according to claim 1, wherein the precipitating agent comprises a known by-product called "red mud" resulting from the decomposition of bauxite during the production of aluminum oxide.

3. A process according to claim 1, wherein the precipitating agent comprises ferric oxide.

4. A process as claimed in claim 1, wherein the precipitating agent comprises ferric hydroxide.

5. A process as claimed in claim 1, wherein the precipitating agent includes a quantity of $Al_2O_3$.

6. A process as claimed in claim 1, wherein the precipitating agent includes a quantity of $TiO_2$.

* * * * *

UNITED STATES PATENT AND TRADEMARK OFFICE
CERTIFICATE OF CORRECTION

PATENT NO. : 3983210
DATED : September 28, 1976
INVENTOR(S) : GEORG STEINTVEIT

It is certified that error appears in the above-identified patent and that said Letters Patent are hereby corrected as shown below:

Column 1, line 18 "weight" should read "by weight"

Column 1, line 37 "decomposition" should read "decomposing"

Column 2, line 48 "znc" should read "zinc"

Column 2, line 63 "as a complex" should read "complexed"

Column 3, line 20 "heated at" should read "heated to"

Column 3, line 27 "0.5" should read "1.5"

Column 3, line 27 "it is" should read "it was"

Column 4, line 36 (Claim 5) "$Al_2O_3$" should read "$Al_2O$"

Signed and Sealed this

Fifteenth Day of March 197'

[SEAL]

Attest:

RUTH C. MASON
*Attesting Officer*

C. MARSHALL DANN
*Commissioner of Patents and Trademarks*